United States Patent Office 2,835,603
Patented May 20, 1958

2,835,603

WATER-SOLUBLE THERMOPLASTIC CELLULOSE ETHER COMPOSITIONS

Richard W. Swinehart, Midland, Miles A. Weaver, Ithaca, and Albert B. Savage and Bernhard V. Moeller, Midland, Mich., assignors to The Dow Chemical Company, Midland, Mich., a corporation of Delaware No Drawing. Application November 25, 1953
Serial No. 394,484

6 Claims. (Cl. 106—189)

This invention relates to thermoplastic compositions of water soluble cellulose ethers which are themselves sufficiently thermoplastic to melt without decomposition.

A method for the fabrication by thermal means of rigid and semi-rigid articles, such as pharmaceutical capsules, from water-soluble cellulose ethers, has long been desired. Thermoplastic compositions made from non-thermoplastic water soluble cellulose ethers have been disclosed, but they require such large amounts of plasticizer that rigid articles cannot be produced except by forming very thick sections. When such articles were desired, it was necessary to cast or to dip the ethers from an aqueous solution, usually containing a small amount of a humectant, and subsequently to evaporate the water. Because of the unique solubility characteristics of most of the cellulose ethers the fabrication of shaped articles from aqueous solutions is very difficult to control. It would be desirable if existing molding equipment and normal hot molding processes could be utilized to form such articles.

It is an object of this invention to provide new and improved thermoplastic compositions consisting chiefly of water soluble cellolose ethers which are themselves thermoplastic.

It is a further object to provide such compositions which show increased compatibility with organic plasticizers.

It is a still further object to provide compositions which may be formed into rigid and semi-rigid articles using conventional thermal fabricating techniques.

The above and related objects are accomplished by using compositions consisting of certain water soluble alkyl hydroxy alkyl cellulose ethers together with propylene glycol or ethylene glycol as a plasticizer.

The cellulose ethers which are useful in carrying out the invention are those alkyl hydroxy alkyl cellulose ethers which melt at a temperature appreciably below their decomposition temperature and which are soluble in water and certain organic solvents. Such ethers as the methyl hydroxyethyl and methyl hydroxypropyl ethers of cellulose, when etherified to an extent as will be later described, are particularly useful.

The cellulose ethers may be prepared by known two step processes, but it is preferred to employ a one step process. In the latter process, cellulose is treated with from 30 to 60 percent aqueous caustic soda solution to give an alkali cellulose with a NaOH/cellulose ratio from 0.7 to 1.5. The alkali cellulose is mixed with from 1.1 to 2.0 parts of methyl chloride per part of cellulose and with 0.45 to 0.50 parts of propylene oxide, or its molecular equivalent of ethylene oxide, per part of cellulose at a temperature below 40° C. for a short time, followed by reaction at 60° C. or higher until etherification is substantially complete. The product is washed with hot water (at a temperature above its aqueous gel point) to remove water soluble impurities.

It is difficult to determine the proportions and amounts of each substituent in a mixed cellulose ether, especially in one prepared in a single step reaction.

When the mixed ethers useful in this invention are examined with infra-red techniques, they are found to have an absorption ratio of oxygen-hydrogen bonds to carbon-hydrogen bonds (OH/CH) of 0.88 to 1.05.[1] By way of contrast, the commercially available non-thermoplastic methyl hydroxypropyl celluloses are found to have an OH/CH ratio of 1.15 to 1.25. It is easier to characterize the ethers by some physical property, such as melting point of the ether or gel point of its water solutions. In the case of this invention, the existence of the desired degree of etherification is best determined by measuring the softening, melting and decomposition temperatures of the ether product. Those temperatures are easily determined by using a melting bar which has progressively increasing temperatures along its length. Films of constant thickness are made up and small pieces placed at varying points on the melting bar. To be useful here, the mixed ethers should have a spread of at least 10 and preferably 20 or more centigrade degrees between melting and decomposition temperatures.

The useful cellulose ethers have gel points in water that are between those of alkyl celluloses and the corresponding commercial alkyl hydroxyalkyl cellulose. For example, the methyl celluloses of commerce have aqueous gel points from 45 to 50° C.; the commercial methyl hydroxypropyl celluloses have aqueous gel points above 60° C., and the cellulose ethers of this invention have gel points of about 55° C. The ethyl derivatives show similar differences in gel points.

When the thermoplasic ethers of this invention are used, it is possible to use smaller amounts of plasticizer to give a moldable composition than when non-thermoplastic ethers are used. It is also possible to use a single plasticizer rather than complex mixtures.

The amount of cellulose ether that may be used in the thermoplastic compositions of this invention may be varied within wide limits between 2 and 90 percent. It should be apparent that the concentration employed will depend on the properties desired in the finished article and on the method of fabrication and on the viscosity type of cellulose ether. For compression molding and vacuum drawing of sheets, it is possible to use as little as 10 to 30 percent plasticizer, while for applications such as the formation of capsules by dipping or drawing, more flexible sheets are desired and it is preferred to use form 5 to 30 percent cellulose ether and from 95 to 70 percent plasticizer. Also, with the higher viscosity grades of cellulose ethers (much over 4000 centipoises), it is extremely difficult to make concentrated solutions of the ether in plasticizer, and such solutions are too viscous for conventional means of fabrication.

It is well known that the degree of substitution of cellulose ethers giving a minimum softening temperature coincides with that degree of substitution giving maximum organic solubility. However, with the simple alkyl ethers, it is equally well known that as the organic solubility is increased the water solubility is progressively decreased. The alkyl hydroxyalkyl ethers of this invention, however, retain their water solubility as the degree of substitution is increased. Also, as the degree of substitution is increased the ethers show increased compatibility with propylene glycol. Such increased compatibility with increased degree of substitution is not shown by the simple alkyl cellulose ethers.

The viscosity grades of the cellulose ethers which may be used in accordance with this invention may vary from 10 centipoises to 100 centipoises. The viscosity grade, by which cellulose ethers are sold commercially, indicates ---
[1] (OH/CH) ratio is the ratio of the optical density of a cellulose ether film measured at 2.9 microns to the optical density of the same film measured at 3.4 microns.

the average viscosity of a 2 percent aqueous solution when measured at 20° C.

EXAMPLE 1

Cotton linters pulp was dipped in 50 percent NaOH and the excess wiped out to leave a ratio of NaOH/cellulose of 1.35:1.0 in the alkali cellulose. The alkali cellulose was then placed in a rotating pressure vessel and propylene oxide and methyl chloride added to give ratios of propylene oxide/cellulose of 0.5:1.0 and of methyl chloride/cellulose of 1.67:1.0. The reactor was heated just under 40° C. for three hours then the temperature was raised according to the following schedule: 2 hours at 45° C.; 2 hours at 50° C.; and finally 2 hours at 60° C. After reacting, the material was washed with hot water at a temperature well above the gel point to remove impurities and then dried. The viscosity of a 2 percent aqueous solution of the product at 25° C. was 68.4 cps. A film of the product was cast from an aqueous solution and dried. When the film was examined with infrared rays, the OH/CH ratio was 0.98. A 20 percent solution of the cellulose ether in propylene glycol was cast into a sheet and vacuum drawn. A sample of this solution when heated to 140° C. remained clear.

EXAMPLE 2

A 29 percent propylene glycol solution of the methyl hydroxypropyl cellulose prepared in Example 1 was made at approximately 140° C. This solution was then cast into a sheet .075 inch thick. The sheet was placed on a Coulton die and drawn into the die by vacuum. Another similarly cast sheet of the same material was placed on top and the top die put in place. The die was heated to 100° C. to seal the capsule. When methyl hydroxyethyl cellulose, prepared in a manner similar to Example 1 was dissolved in propylene glycol and cast into a sheet, it was found that similar capsules could be formed.

EXAMPLE 3

An 11.7 percent propylene glycol solution of a 278 cps. grade of a methyl hydroxypropyl cellulose prepared as in Example 1 was made. This solution was heated to 140° C. and brass pins such as are used for shaping gelatine capsules were dipped into the solution. The pins were placed in an oven for 1 hour at 120° C. following which the capsule halves were stripped from the pins. These capsules compared favorably with hard gelatine capsules.

By way of contrast, a 5 percent propylene glycol solution of a commercially available non-thermoplastic methyl hydroxypropyl cellulose of 25 cps. viscosity grade was prepared. This solution was too viscous to prepare capsules in the manner described.

EXAMPLE 4

Several solutions of different water-soluble cellulose ethers of comparable viscosity grades were prepared to compare their thermoplasticity. The solvent used was 50 percent aqueous methanol. The ether solutions were cast into films 0.003 inch thick and the softening, melting, and decomposition temperatures determined by placing small pieces of each film on a melting bar. The results are listed in Table 1.

*Table 1*

| Ether | Softening Temp., °C. | Melting Temp., °C. | Decomposition Temp. |
|---|---|---|---|
| Thermoplastic methyl hydroxypropyl cellulose. | 255 | 259 | 293° C. |
| Thermoplastic ethyl hydroxypropyl cellulose. | 125 | 137 | 215° C. |
| Non-thermoplastic methyl hydroxyethyl cellulose. | | | charred at 270° C. without melting. |
| Methyl cellulose | 293 | | browned at 293° C. without melting. |
| Non-thermoplastic methyl hydroxypropyl cellulose. | 284 | 293 | 293° C. |
| Hydroxyethyl cellulose | | | charred at 250° C. without melting. |

As can be seen from the above table, the cellulose ethers useful in this invention soften and melt several degrees below the decomposition temperature. In contrast, the conventional water soluble cellulose ethers available commercially do not melt below their decomposition temperatures. Thus, the ethers useful in this invention are those which exhibit sufficient thermoplasticity to be heat fabricated, whereas the more common cellulose ethers decompose before softening enough to be molded.

We claim:

1. A thermoplastic composition consisting essentially of (a) from 2 to 90 percent by weight of a water-soluble alkyl hydroxyalkyl cellulose in which the hydroxy-alkyl group contains from 2 to 3 carbon atoms and the alkyl group contains from 1 to 3 carbon atoms and in which the O—H/C—H ratio is from 0.88 to 1.05 and the melting point is at least 10 centigrade degrees below the decomposition temperature, and (b) correspondingly from 98 to 10 percent of propylene glycol.

2. A composition as claimed in claim 1, adapted for thermal molding operations, consisting of from 70 to 90 percent of the defined cellulose ether and correspondingly from 30 to 10 percent of propylene glycol.

3. A composition as claimed in claim 1, adapted for capsule making, consisting of from 5 to 30 percent of the defined cellulose ether and correspondingly from 95 to 70 percent of propylene glycol.

4. A thermoplastic composition consisting essentially of (a) from 2 to 90 percent by weight of a water-soluble methyl hydroxypropyl cellulose in which the

O—H/C—H ratio is from 0.88 to 1.05 and the melting point is at least 10 centigrade degrees below the decomposition temperature, and (b) correspondingly from 98 to 10 percent of propylene glycol.

5. A composition as claimed in claim 4, adapted for thermal molding operations, consisting of from 70 to 90 percent of the defined cellulose ether and correspondingly from 30 to 10 percent of propylene glycol.

6. A composition as claimed in claim 4, adapted for capsule making, consisting of from 5 to 30 percent of the defined cellulose ether and correspondingly from 95 to 70 percent of propylene glycol.

References Cited in the file of this patent

UNITED STATES PATENTS

| 2,440,626 | Young et al. | Apr. 27, 1948 |
| 2,602,755 | Silvernail | July 8, 1952 |
| 2,653,108 | Oakley | Sept. 22, 1953 |